Figure 1:
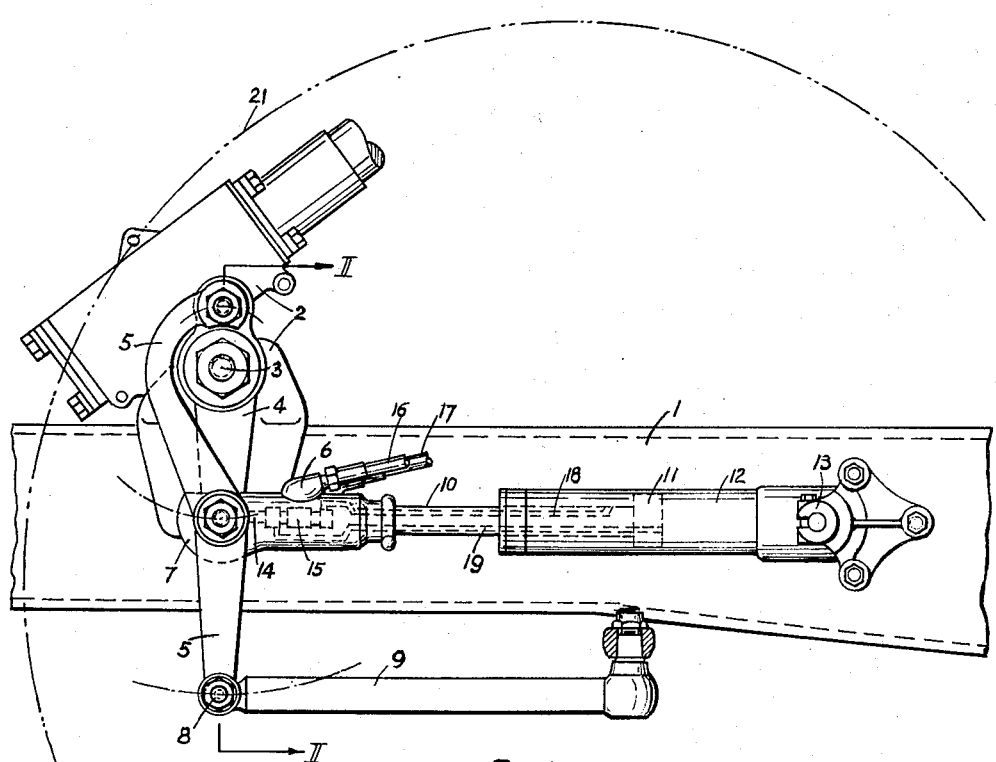

July 8, 1958 F. OSTWALD 2,842,219
STEERING DEVICE FOR AUTOMOTIVE VEHICLES WITH SERVO CONTROL
Filed June 30, 1954

FRITZ OSTWALD
INVENTOR
BY *[signature]*
*Attorney*

United States Patent Office 2,842,219
Patented July 8, 1958

2,842,219

STEERING DEVICE FOR AUTOMOTIVE VEHICLES WITH SERVO CONTROL

Fritz Ostwald, Heppenheim, Bergstrasse, Germany, assignor to Alfred Teves, Maschinen- und Armaturenfabrik Kom. Ges., Frankfurt, Germany Application June 30, 1954, Serial No. 440,461

Claims priority, application Germany July 31, 1953

1 Claim. (Cl. 180—79.2)

The present invention relates to a steering device for automotive vehicles with servo control, in particular power steering. Unlike mechanical or hydraulic automotive steering gears, wherein, apart from efficiency losses, the ratio of the forces or torques always corresponds to a definite ratio of rectilinear or angular displacements (the forces being inversely as the displacements), servo controls have the property of permitting various ratios of forces independently of the ratio of the displacements. For example, if the steering of a truck, say, requires a torque of 750 foot pounds on the knuckle, then if the steering gear used has a gear ratio of 1:25, a torque of 30 foot pounds must be applied to the steering wheel. If this torque is to be reduced to 7½ foot pounds, then it will be necessary either to step up the ratio of the steering gear to 1:100, in which case the steering-wheel angle required for a given steering angle would be quadrupled, or else to provide a servo control, in which the original gear ratio can be maintained or even stepped down in order to obtain small steering-wheel angles. In both cases, the ratio of the angles, or displacements, between the knuckle and the steering gear can be preserved and kept constant independently of the forces involved.

The situation is essentially different as regards the force or torque ratio. For example, a balanced control valve, as known in various hydraulic or pneumatic mechanisms, will furnish an unlimited transmission ratio, except for the small frictional forces opposing its displacement. If such a valve, without other auxiliary devices, is used as control means for a power steering gear, the angular ratio is preserved but the transmission ratio is increased without limit. Minute forces applied to the steering wheel, and occasioned by friction only, suffice to release any required steering forces, limited only by the maximum pressure of the servo-mechanism.

Now it has been found that such mechanisms are unsuitable for operation of high-speed vehicles. In power steering, as in conventional manual steering, there must be not only a definite displacemental and angular but also a definite force and torque ratio between the steering wheel and the knuckle, if the driver's sense of wheel-road contact and hence safety of operation are to be preserved.

A known expedient serving this purpose is to hold the control valve in central neutral position by means of restoring springs. If these springs are initially under stress, then the boost effect will not occur until a certain minimum force, namely the said initial stress, has been exceeded. Up to this point, the boost ratio is zero. With increasing manual force, or displacing force on the control valve, the boost increases progressively, so that "overcontrol" may readily occur.

In un-prestressed restoring springs are used, then, depending on details of design, various modifications of boost can be obtained, but there will not be a constant ratio between manual force and effective force as there is in the case of a mechanical steering gear.

In order to create such a condition, it is also known that the control means (valve) may be backed up with the same pressure generated by displacement of the control means in the servo cylinder. The transmission ratio will then correspond to the ratio between the areas of the servo piston and the face of the control means, and will therefore be constant.

In the device contemplated by the invention, the same effect is obtained in steering devices by means of a double-lever mechanism which, in addition to simplicity of construction, has the advantage that undesirable reactions, varying with position and load of the steering device, on the part of the servo forces, upon the displacement of the control means in axial or radial direction, e. g. force components of the steering connecting rod, are avoided.

The structure and function of this lever mechanism will be further described in terms of the accompanying drawing, wherein an embodiment of the invention is shown by way of example, but not of limitation.

Figure 2:
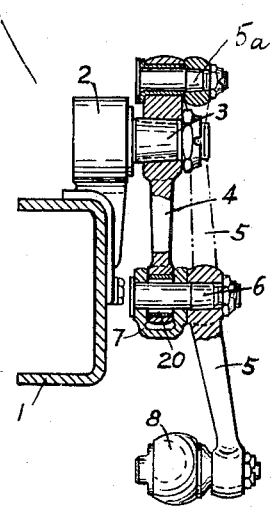

In the drawings:

Fig. 1 is a side elevation of the steering device according to the invention, and Fig. 2 is an elevation, partly in section, taken at right angles with respect to Fig. 1, along line II—II of the same.

On the chassis 1 of a vehicle, a steering gear 2 is mounted, with a shaft 3 supporting a two-arm lever 4. To the upper arm of lever 4, a lever 5 is articulated on a pin 5a. Lever 5 is further connected by means of a pin 6 to the casing 7 of a power steering valve, and by means of a universal joint 8, to a direct steering gear connecting rod 9. The power steering mechanism, in addition to the casing 7, comprises a piston rod 10 with piston 11 in cylinder 12, pivotally mounted in a bearing 13 on the chassis 1. The lower arm of lever 4 with its bearing 20 embraces pin 6 with a certain radial clearance shown in Fig. 2 and required to deflect the servo mechanism, and is itself articulated with a valve slide 15 by means of a pin 14. By axial displacement of the slide 15, the pressure medium entering through a connection 16 and issuing through a connection 17 is passed through lines 18 and 19 inside the piston rod 10, to one side or the other of the piston. Displacement of the control slide to the left causes pressure to build up on the right-hand side of the piston 11, and displacement to the right causes pressure to build up on the left-hand side of the piston, so that piston 11, piston rod 10, valve casing 7, lever 5 connected to casing 7 by pin 6, and hence also the connecting rod 9, will follow the valve slide in the direction of its motion at all times, under the action of its pressure. If shaft 3, for example by means of a steering wheel, is rotated clockwise, the lower end of the lever 4, subject to the aforesaid clearance, will carry along slide 15 to the left by means of part 14, as a result of which pressure will build up in the working cylinder to the right of piston 11, and casing 7 will likewise be displaced to the left. Because of the resistance of the steered wheels 21 rolling on the road surface, a tension is set up in the connecting rod 9, so that the lever 5 tends to rotate counterclockwise upon articulations 8 and 6. However, since it is articulated to the upper arm of lever 4, it exerts a likewise counterclockwise torque on the latter lever. Hence a torque acting contrary to the original direction of rotation is applied to lever 4, and therefore to shaft 3. By suitable choice of proportions of the lever arms, any desired boost ratio may be obtained. Since the lengths of the lever arms are permanently constant, the boost ratio will also be constant.

The connecting rod 9, in the course of steering operations and spring action of the front axle of the vehicle, may assume various positions without permitting force components to act on the control valve in the sense of undesirable parasite control effects. An additional bearing on the chassis, with connecting lever by means of which power steering forces are transmitted to the connecting rod, as in many other devices, is not required.

By means of the invention, substantially the following advantages over known devices are achieved:

Reduced structural length and possibility of installation within the "wheel circle" of existing vehicles, without interfering with the wheel freedom so important precisely in the case of large vehicles;

Assurance of positive connection between shaft 3 of steering gear and connecting rod 9 by levers 4 and 5, which may be of very sturdy construction, even if there should be a structural or functional failure elsewhere in the steering system;

Steering independent of direction of force on connecting rod 9;

In contradistinction from other devices, elimination of connecting lever separately mounted on an additional bearing.

What I claim is:

A steering device for vehicle chassis, with servo control, comprising a steering gear; a steering gear shaft; a double-armed lever fixedly mounted on said shaft and formed with an upper arm and a lower arm; a second lever articulated adjacent one of its ends to the upper arm of said double-armed lever; an operating cylinder pivotally mounted on the vehicle chassis; a piston slidable in said cylinder; a piston rod whose one end is secured to said piston; a control slide; a housing for said control slide, said housing secured to the other end of said piston rod; a pin connecting said second lever intermediate its end to said control slide housing; means connecting said second lever adjacent its other end to a connecting rod in a manual steering gear; the lower arm of said double-armed lever being articulated to said control slide in said housing, said connecting pin being embraced by the lower arm of said double-armed lever with radial clearance, said piston and said piston rod having bores therein communicating with said control slide housing for allowing the passage of pressure medium to one or the other side of said piston in dependence on the position of the control slide, thus moving the piston in the direction of movement of the slide, whereby when the control slide is angularly displaced by the steering gear shaft, said piston and said rod will follow in the same direction to assist in the steering.

References Cited in the file of this patent

UNITED STATES PATENTS

| | | |
|---|---|---|
| 2,341,502 | Ingress | Feb. 8, 1944 |
| 2,462,994 | Price | Mar. 1, 1949 |
| 2,688,258 | Haynes et al. | Sept. 7, 1954 |